(12) United States Patent

He et al.

(10) Patent No.: US 12,640,619 B2

(45) Date of Patent: May 26, 2026

(54) CONNECTOR FOR MOTOR, MOTOR, AND VEHICULAR COMPRESSOR

(71) Applicant: Robert Bosch GmbH, Stuttgart (DE)

(72) Inventors: Guofu He, Changsha (CN); Remind Wan, Changsha (CN); Yilin Wang, Changsha (CN); Carsten Vollmer, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 217 days.

(21) Appl. No.: 18/735,643

(22) Filed: Jun. 6, 2024

(65) Prior Publication Data

US 2024/0413702 A1 Dec. 12, 2024

(30) Foreign Application Priority Data

Jun. 7, 2023 (CN) .......................... 202310673275.0

(51) Int. Cl.
   *H02K 5/22* (2006.01)
   *B60H 1/32* (2006.01)

(52) U.S. Cl.
   CPC .......... *H02K 5/225* (2013.01); *B60H 1/3223* (2013.01)

(58) Field of Classification Search
   CPC ............ H02K 5/225; H02K 5/10; H02K 1/12; H02K 5/04; H02K 5/22; H02K 3/50; H02K 11/30; B60H 1/3223; F04B 35/04; H01R 9/24; H01R 2201/10

USPC ........................................................ 310/71
See application file for complete search history.

(56) References Cited

U.S. PATENT DOCUMENTS

| | | | | |
|---|---|---|---|---|
| 5,801,465 | A * | 9/1998 | Yamada | H02K 11/40 439/271 |
| 7,211,914 | B2 * | 5/2007 | Hofmann | H02K 29/08 310/85 |
| 10,749,406 | B2 * | 8/2020 | Fukuzawa | H02K 5/225 |
| 2024/0213844 | A1 * | 6/2024 | He | F25B 31/026 |

* cited by examiner

*Primary Examiner* — Ahmed Elnakib

(74) *Attorney, Agent, or Firm* — Michael Best & Friedrich LLP

(57) ABSTRACT

The present disclosure relates to a connector for a motor, a motor, and a vehicular compressor. The connector has a substrate and a plurality of stator terminals disposed on the substrate. The connector is further disposed with an insulation adhesive receiving part having a body detachably secured on the substrate; an opening for at least two stator terminals of the plurality of stator terminals to pass through; and a panel extending outwardly from a side of the body away from the substrate and circumferentially disposed along the opening for enclosing a space to receive the insulation adhesive. A first sealing portion is disposed on a side of the body proximate to the substrate, and a second sealing portion is disposed at a corresponding location of the substrate. The first sealing portion and the second sealing portion are sealed, press-fit and circumferentially disposed along the opening.

10 Claims, 4 Drawing Sheets

1

CONNECTOR FOR MOTOR, MOTOR, AND VEHICULAR COMPRESSOR

BACKGROUND

The present disclosure relates to the field of electronic devices, and more particularly, to a connector for a motor, a motor disposed with a connector, and a vehicular compressor configured with a motor.

In existing vehicular compressors, the motor is electrically connected to an electronic control unit (ECU) for a vehicle, typically by means of a connector, such that the motor is drivenly controlled by the ECU. A plurality of terminals for connection to a printed circuit board within the ECU and several stator terminals for connection to a stator end of a motor by laser welding are disposed on the connector. Because the motor housing of the vehicular compressor typically receives a large amount of oil fluid inside, in order to prevent the oil fluid from contacting the stator terminals and causing short circuit, the stator terminals need to be insulated, but the plastic member for receiving the insulation adhesive requires multiple injection molding, which is not only results in high production costs but is also difficult to manufacture.

Therefore, there is an urgent need for an improved connector for the motor to solve or mitigate the above-mentioned problems.

SUMMARY

The purpose of the present disclosure is to solve or mitigate to a certain extent the technical problems raised above.

According to the present disclosure, a connector for a motor is provided, the connector having a substrate and a plurality of stator terminals disposed on the substrate, the connector being further disposed with an insulation adhesive receiving part comprising a body detachably secured on the substrate;

an opening for at least two stator terminals of the plurality of stator terminals to pass through; and a panel extending outwardly from a side of the body away from the substrate and circumferentially disposed along the opening for enclosing a space for receiving the insulation adhesive;

wherein, a first sealing portion is disposed on a side of the body proximity to the substrate and a second sealing portion is disposed at a corresponding location of the substrate, the first sealing part and the second sealing part being sealed, press-fit and circumferentially disposed along the opening.

Optionally, in the connector as previously described, the first sealing portion has at least two sealing surfaces and the second sealing portion is disposed with two sealing surfaces, wherein the at least two sealing surfaces of the first sealing portion and the two sealing surfaces of the second sealing portion are mutually abutting.

Optionally, in the connector as previously described, the plurality of stator terminals comprises a first stator terminal, a second stator terminal, a third stator terminal, a fourth stator terminal, a fifth stator terminal, and a sixth stator terminal, the opening comprises a first opening, a second opening, and a third opening, the panel comprises a first panel corresponding to the first opening, a second panel corresponding to the second opening, and a third panel corresponding to the third opening,

wherein, the first opening is for the first stator terminal and the second stator terminal to pass through, the second opening is for the third stator terminal and the fourth stator terminal to pass through, the third opening is for the fifth stator terminal and the sixth stator terminal to pass through.

Optionally, in the connector as previously described, the insulation adhesive receiving part is made of plastic and integrally molded.

Optionally, in the connector as previously described, the body is secured to the substrate by press fitting.

Optionally, in the connector as previously described, the insulation adhesive receiving part is disposed with two positioning holes and/or clamping portions for clamping.

Optionally, in the connector as previously described, the insulation adhesive receiving part is disposed with a first rib plate and a second rib plate for reinforcing structural strength, wherein the first rib plate is secured between the first panel and the second panel and the second rib plate is secured between the second panel and the third panel.

Optionally, in the connector as previously described, one of the first sealing portion and the second sealing portion has a convex cross-section and the other has a concave cross-section.

According to the present disclosure, a motor is further provided, the motor being disposed with the above-mentioned connector, wherein the first stator terminal and the second stator terminal are U-phase terminals, the third stator terminal and the fourth stator terminal are V-phase terminals, and the fifth stator terminal and the sixth stator terminal are W-phase terminals.

According to the present disclosure, a vehicular compressor is further provided, the vehicular compressor being configured with the above-mentioned motor and ECU.

It can be understood that the connector for the motor of the present disclosure does not require multiple injection molding, which simplifies the production and processing process, improves production efficiency, reduces the production costs of enterprises, and the connector processed has good sealability, ensuring product quality.

BRIEF DESCRIPTION OF THE DRAWINGS

With reference to the accompanying drawings, the content disclosed in the present disclosure will become easier to understand. It is readily understood by those skilled in the art that: These accompanying drawings are for the purpose of illustration only and are not intended to limit the scope of protection of the present disclosure. Further, the similar numerals in the figures are used to represent the similar components, wherein.

DETAILED DESCRIPTION

In order to provide a clearer understanding of the above-mentioned objects, features and advantages of the present disclosure, the specific examples of the present disclosure are described in detail below with reference to the accompanying drawings. First, it should be noted that the terms up, down, left, right, front, rear, inside, outside, top, bottom, and the like mentioned or possibly mentioned in the Specification are defined relative to the constructions shown in the accompanying drawings and are relative concepts, and therefore may vary accordingly depending on their different locations and different states of use. Therefore, these or other orientation terms should not be construed as limiting.

Figure 1:
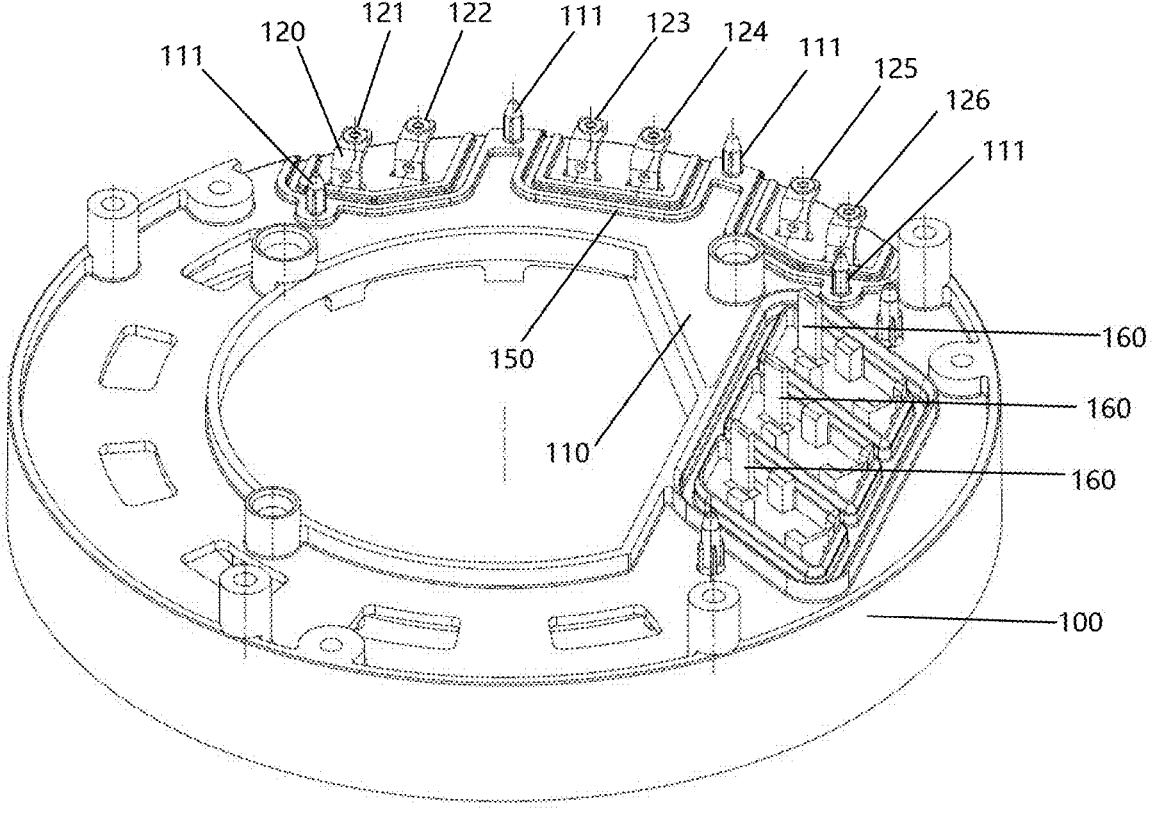
FIG. 1 shows an exemplary schematic diagram of a structure of a connector for an ECU when an insulation adhesive receiving part is omitted, according to the disclosure of the present disclosure.

FIG. 1 shows a schematic diagram of a structure of a connector for a motor according to the disclosure of the present disclosure. It can be seen clearly in FIGS. 1 and 2 that the connector 100 consists of a substrate 110, a plurality of stator terminals 120 disposed on the substrate 110, an insulation adhesive receiving part 130, and the like, wherein the insulation adhesive receiving part 130 comprises a body 131 that is secured on the substrate 110 by a detachable manner, such as by press fitting. In particular, several dowel pins 111 may be disposed on the substrate 110 of the connector 100, while several holes 138 may be disposed at a corresponding location of the insulation adhesive receiving part 130 to accommodate the dowel pins 111. During assembly, the securing and installation of the insulation adhesive receiving part 130 may be accomplished by simply inserting the dowel pins 111 of the substrate 110 into the corresponding holes 138 on the body 131 of the insulation adhesive receiving part 130. It should be noted that the insulation adhesive receiving part 130 may be made of plastic, such as nylon plastic, and integrally molded. Continuing to refer to FIG. 1, the insulation adhesive receiving part 130 further comprises an opening 132 and a panel 133, wherein, the opening 132 is for at least two stator terminals of the plurality of stator terminals 120 to pass through, the panel 133 extends outwardly from a side of the body 131 away from the substrate 110, such as in a direction perpendicular to a surface of the body 131 and circumferentially disposed along the opening 132 for enclosing a space for receiving the insulation adhesive. A first sealing portion 140 is disposed on a side of the body 131 proximity to the substrate 110 and a second sealing portion 150 is disposed at a corresponding location of the substrate 110, the first sealing portion 140 and the second sealing portion 150 being sealed, press-fit and circumferentially disposed along the opening 132. In this way, insulation failure of the stator terminal from the leakage of the insulation adhesive in the insulation adhesive receiving part 130 may be effectively prevented.

Figure 3:
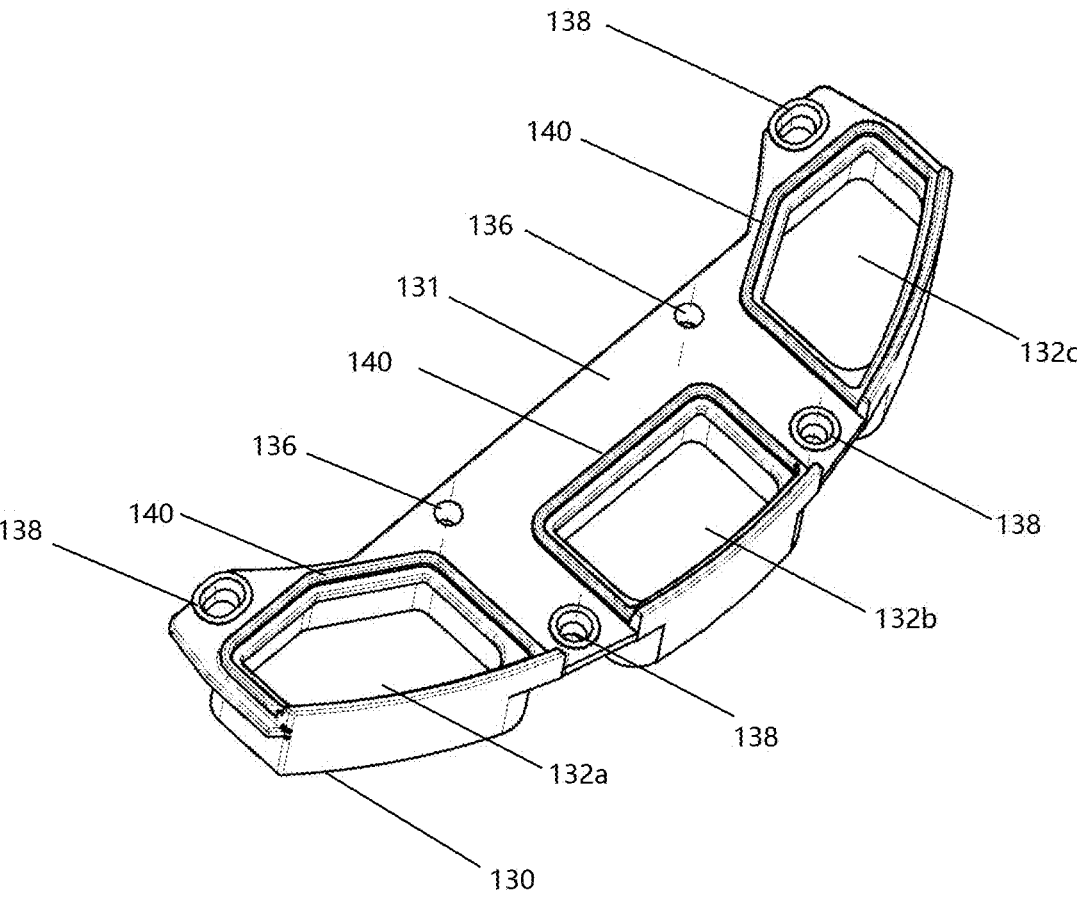
FIG. 3 shows an exemplary schematic diagram of a structure from the bottom of an insulation adhesive receiving part for a connector of an ECU disclosed according to the present disclosure.
Figure 4:
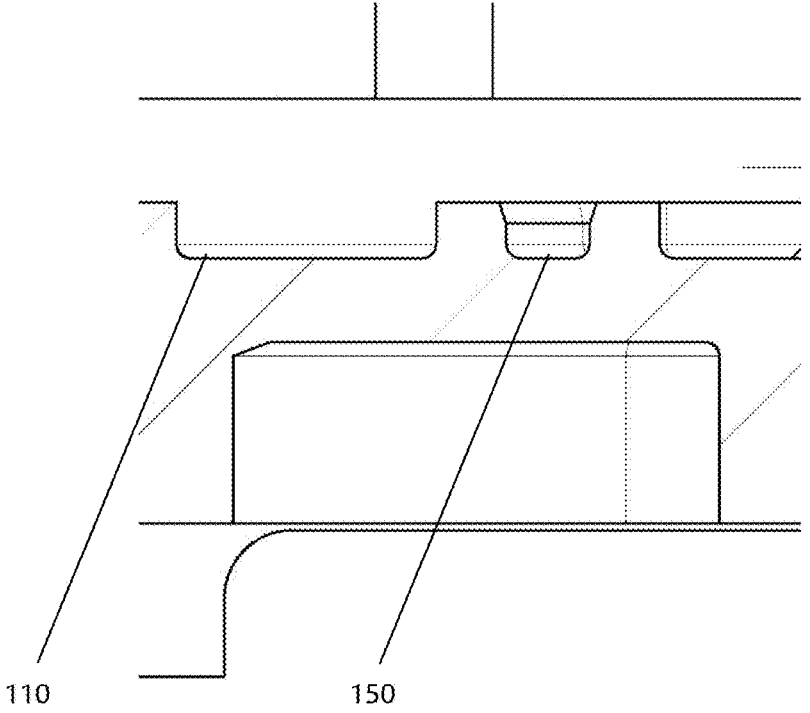
FIG. 4 shows an exemplary partial cross-sectional schematic diagram of a first sealing portion for a connector of an ECU disclosed according to the present disclosure.

In conjunction with the abovementioned example and in other optional examples, the first sealing portion 140 has at least two sealing surfaces and the second sealing portion 150 is disposed with two sealing surfaces, wherein, the at least two sealing surfaces of the first sealing portion 140 and the at least two sealing surfaces of the second sealing portion 150 are mutually abutting, as shown in FIGS. 1 and 3. For example, the first sealing portion 140 has a concave cross-section (refer to FIG. 4) and the second sealing portion 150 has a convex cross-section, both of which nest each other to enable the respective three sealing surfaces to mutually abut each other, resulting in a better sealing effect. Of course, it is readily understood by those skilled in the art that it is also feasible for the first sealing portion 140 to have a convex cross-section and the second sealing portion 150 to have a concave cross-section.

Figure 2:
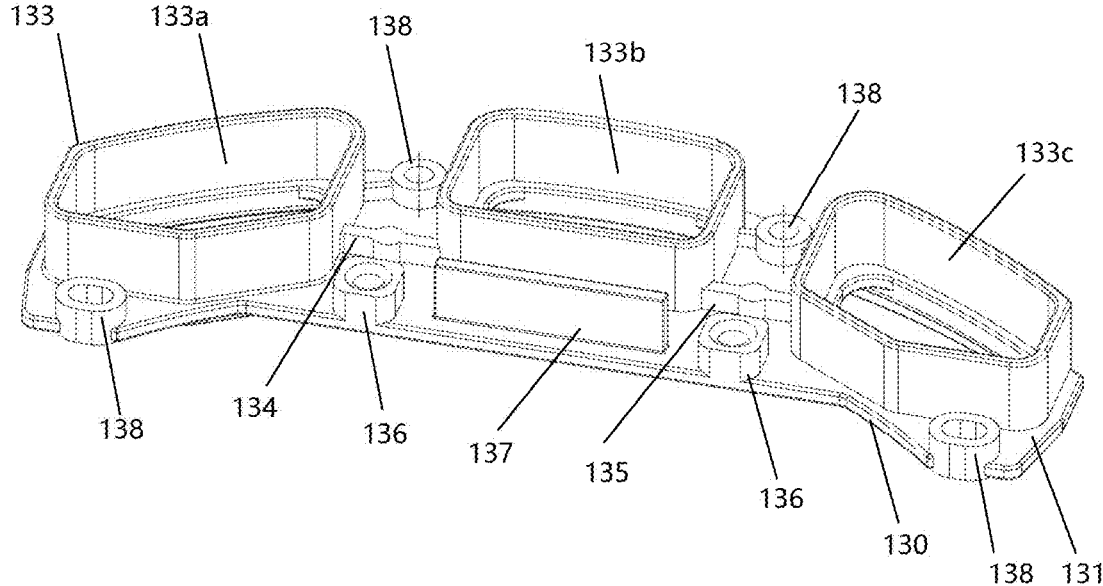
FIG. 2 shows an exemplary schematic diagram of a structure from the top of an insulation adhesive receiving part for a connector of an ECU disclosed according to the present disclosure.

In the example shown in FIGS. 1 and 2, the plurality of stator terminals 120 comprises a first stator terminal 121, a second stator terminal 122, a third stator terminal 123, a fourth stator terminal 124, a fifth stator terminal 125, and a sixth stator terminal 126. The opening 132 comprises a first opening 132*a*, a second opening 132*b*, and a third opening 132*c*, the panel 133 comprises a first panel 133*a* corresponding to the first opening 132*a*, a second panel 133*b* corresponding to the second opening 132*b*, and a third panel 133*c* corresponding to the third opening 132*c*. The first opening 132*a* is for the first stator terminal 121 and the second stator terminal 122 to pass through, the second opening 132*b* is for the third stator terminal 123 and the fourth stator terminal 124 to pass through, and the third opening 132*c* is for the fifth stator terminal 125 and the sixth stator terminal 126 to pass through.

Continuing to refer to FIG. 2, the insulation adhesive receiving part 130 is disposed with a first rib plate 134 and a second rib plate 135 for reinforcing structural strength, wherein, the first rib plate 134 is secured between the first panel 133*a* and the second panel 133*b*, and the second rib plate 135 is secured between the second panel 133*b* and the third panel 133*c*.

It is readily understood that the insulation adhesive receiving part 130 is disposed with two positioning holes 136 to facilitate positioning of the insulation adhesive receiving part 130 by a robot arm through the positioning holes 136. Further, the insulation adhesive receiving part 130 is further disposed with a clamping portion 137 for clamping, which may be designed into a plate-like structure to facilitate the clamping of the clamping portion 137 by a gripper of the robot arm.

In addition, the present disclosure further provides a motor disposed with the connector 100, the motor possibly being a three-phase motor comprising a U-phase, a V-phase, and a W-phase, wherein, the first stator terminal 121 and the second stator terminal 122 are U-phase terminals, the third stator terminal 123 and the fourth stator terminal 124 are V-phase terminals, and the fifth stator terminal 125 and the sixth stator terminal 126 are W-phase terminals.

Figure 5:
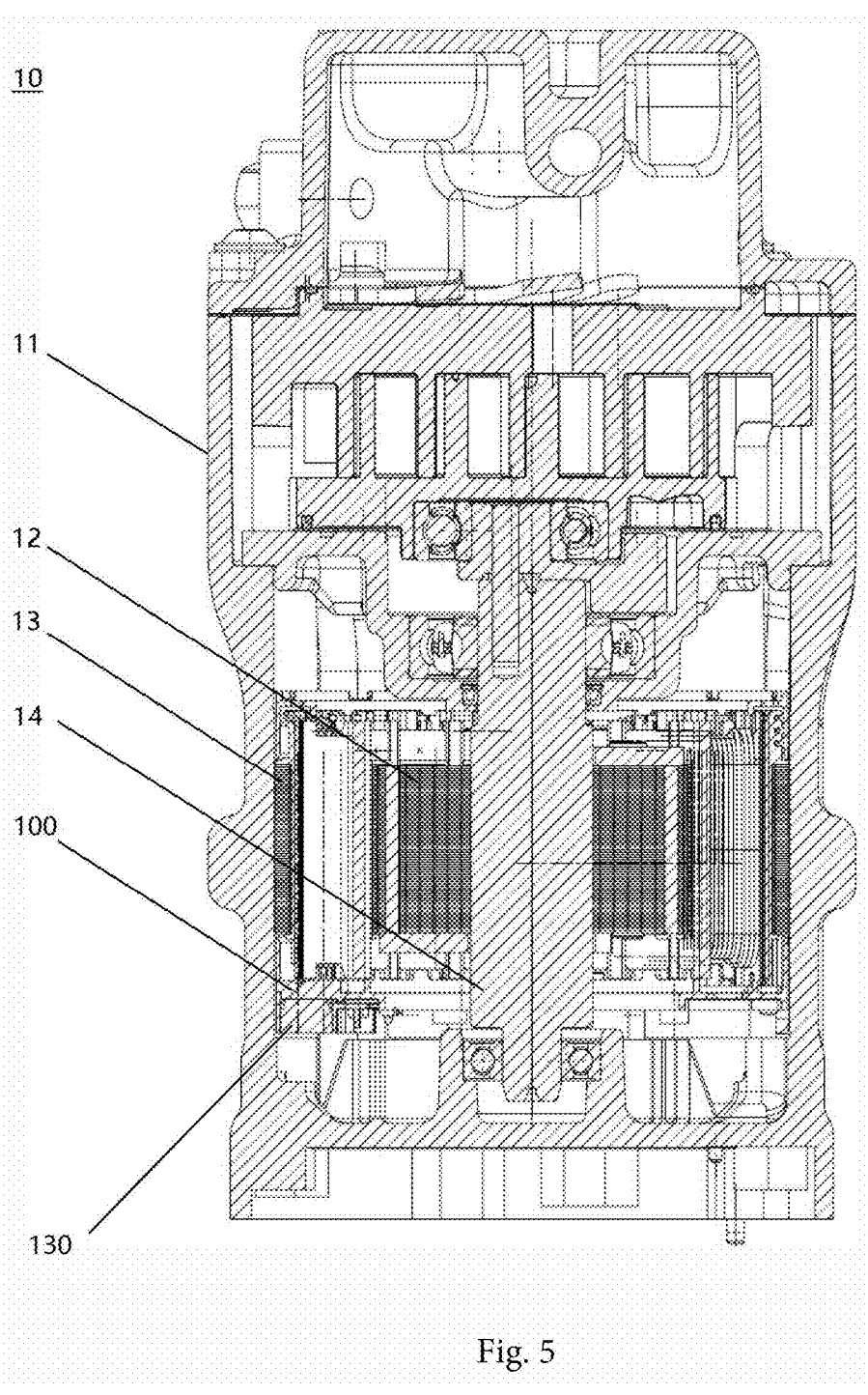
FIG. 5 shows an exemplary partial cross-sectional schematic diagram of a vehicular compressor disclosed according to the present disclosure.

In addition, the present disclosure further provides a vehicular compressor 10 configured with the above-mentioned motor and ECU, the motor being located within the motor housing 11 of the vehicular compressor 10 and being drivenly controlled by the ECU (not shown). In particular, the motor comprises components such as a rotor 12, a stator 13, a rotating shaft 14 and the like, as shown in FIG. 5. One end of each of the first stator terminal 121, the second stator terminal 122, the third stator terminal 123, the fourth stator terminal 124, the fifth stator terminal 125, and the sixth stator terminal 126 is electrically connected to the stator 13, and the other end is electrically connected to a pin 160 disposed on the substrate 110, which simultaneously maintains an electrical connection with a printed circuit board (not shown) of the ECU.

In summary, the connector for the motor of the present disclosure has a simple and compact structure and good sealability. There is no need for multiple injection molding during production, which greatly simplifies the manufacturing process, is conducive to reducing production costs and thus improves the market competitiveness of products.

Several specific embodiments are listed above to elaborate on the connector for the motor, the motor disposed with the connector, and the vehicular compressor disposed with the motor according to the present disclosure. These examples are only used to illustrate the principles of the present disclosure and the examples thereof, and are not intended to limit the present disclosure. Without departing from the spirit and scope of the present disclosure, those skilled in the art may also make various modifications and improvements. Therefore, all equivalent technical solutions shall fall within the scope of the present disclosure and be defined by the various claims of the present disclosure.

The invention claimed is:

1. A connector for a motor, the connector (100) having a substrate (110) and a plurality of stator terminals (120) disposed on the substrate (110), wherein the connector (100) is further disposed with an insulation adhesive receiving part (130) comprising:

a body (131) detachably secured on the substrate (110);

an opening (132) for at least two stator terminals of the plurality of stator terminals (120) to pass through; and a panel (133) extending outwardly from a side of the body (131) away from the substrate (110) and circumferentially disposed along the opening (132) for enclosing a space for receiving the insulation adhesive;

wherein, a first sealing portion (140) is disposed on a side of the body (131) proximate to the substrate (110) and a second sealing portion (150) is disposed at a corresponding location of the substrate (110), the first sealing portion (140) and the second sealing portion (150) being sealed, press-fit and circumferentially disposed along the opening (132).

2. The connector according to claim 1, wherein the first sealing portion (140) has at least two sealing surfaces and the second sealing portion (150) includes at least two sealing surfaces, wherein the at least two sealing surfaces of the first sealing portion (140) and the at least two sealing surfaces of the second sealing portion (150) are mutually abutting.

3. The connector according to claim 2, wherein the plurality of stator terminals (120) comprises a first stator terminal (121), a second stator terminal (122), a third stator terminal (123), a fourth stator terminal (124), a fifth stator terminal (125), and a sixth stator terminal (126), the opening (132) comprises a first opening (132a), a second opening (132b), and a third opening (132c), the panel (133) comprises a first panel (133a) corresponding to the first opening (132a), a second panel (133b) corresponding to the second opening (132b), and a third panel (133c) corresponding to the third opening (132c), wherein, the first opening (132a) is for the first stator terminal (121) and the second stator terminal (122) to pass through, the second opening (132b) is for the third stator terminal (123) and the fourth stator terminal (124) to pass through, and the third opening (132c) is for the fifth stator terminal (125) and the sixth stator terminal (126) to pass through.

4. The connector according to claim 3, wherein the insulation adhesive receiving part (130) is disposed with a first rib plate (134) and a second rib plate (135) for reinforcing structural strength, wherein the first rib plate (134) is secured between the first panel (133a) and the second panel (133b), and the second rib plate (135) is secured between the second panel (133b) and the third panel (133c).

5. The motor comprising the connector (100) according to claim 3, wherein the motor is a three-phase motor, the first stator terminal (121) and the second stator terminal (122) are U-phase terminals, the third stator terminal (123) and the fourth stator terminal (124) are V-phase terminals, and the fifth stator terminal (125) and the sixth stator terminal (126) are W-phase terminals.

6. A vehicular compressor (10) comprising the motor according to claim 5.

7. The connector according to claim 1, wherein the insulation adhesive receiving part (130) is made of plastic and integrally molded.

8. The connector according to claim 1, wherein the body (131) is secured to the substrate (110) by press fitting.

9. The connector according to claim 1, wherein the insulation adhesive receiving part (130) is disposed with two positioning holes (136) and/or a clamping portion (137) for clamping.

10. The connector according to claim 1, wherein one of the first sealing portion (140) or the second sealing portion (150) has a convex cross-section and the other has a concave cross-section.

* * * * *